No. 878,799. PATENTED FEB. 11, 1908.
F. E. HAVEN.
TURBINE.
APPLICATION FILED JAN. 12, 1907.

6 SHEETS—SHEET 1.

Witnesses: Inventor:
Frank E. Haven
by J. M. Thomas
Attorney.

No. 878,799. PATENTED FEB. 11, 1908.
F. E. HAVEN.
TURBINE.
APPLICATION FILED JAN. 12, 1907.

6 SHEETS—SHEET 4.

Witnesses:
Inventor:
Frank E. Haven
by J. M. Thomas
Attorney.

No. 878,799. PATENTED FEB. 11, 1908.
F. E. HAVEN.
TURBINE.
APPLICATION FILED JAN. 12, 1907.

6 SHEETS—SHEET 5.

Witnesses:

Inventor:
Frank E. Haven
by J. M. Thomas
Attorney.

No. 878,799. PATENTED FEB. 11, 1908.
F. E. HAVEN.
TURBINE.
APPLICATION FILED JAN. 12, 1907.
6 SHEETS—SHEET 6.
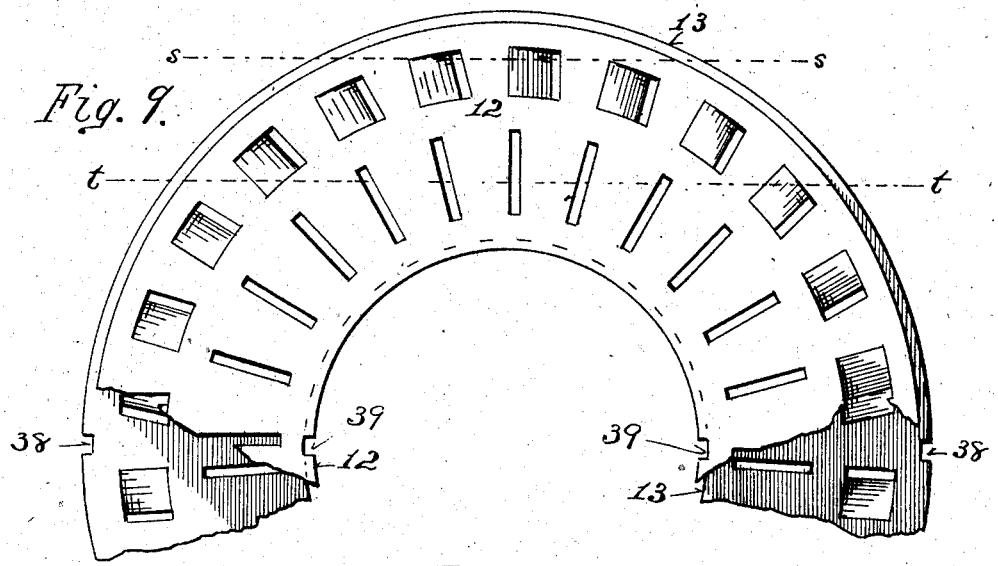
Fig. 9.
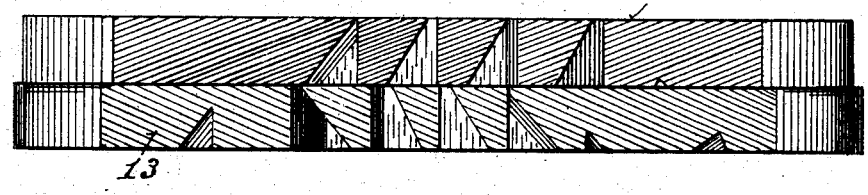
Fig. 10.
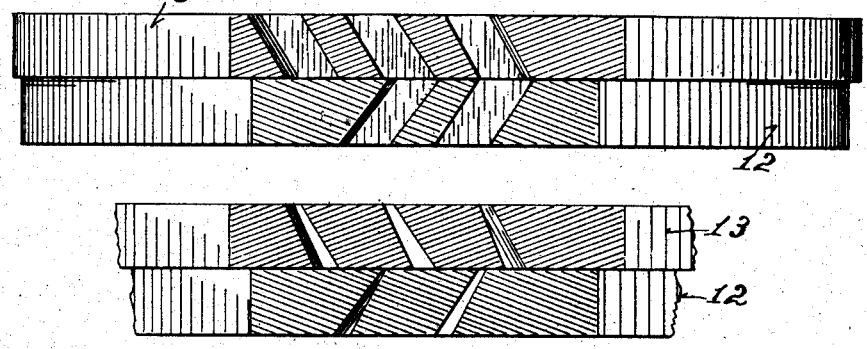
Fig. 11.
Fig. 12.
Witnesses:
N. H. Cutright
Percy Hallen
Inventor:
Frank E. Haven
by J. M. Thomas
Attorney.

UNITED STATES PATENT OFFICE.

FRANK E. HAVEN, OF SALT LAKE CITY, UTAH.

TURBINE.

No. 878,799.  Specification of Letters Patent.  Patented Feb. 11, 1908.

Application filed January 12, 1907. Serial No. 352,037.

*To all whom it may concern:*

Be it known that I, FRANK E. HAVEN, a citizen of the United States, and residing at Salt Lake City, Salt Lake county, State of Utah, have invented a new and useful Improvement in Steam-Engines, called the "Deflector Expanding Turbine-Engine," of which the following is a specification.

My invention relates to improvements in that class or type of engines, known as rotary or turbine, the purpose being to modify the construction so far used in this type of engines, as to provide an automatic balance of the rotating mechanism, and to obtain a higher degree of efficiency and economy and to utilize to its fullest extent the expanding power of the steam. I attain these objects by the improvements shown in the accompanying drawings, in which similar letters of reference, indicate like parts throughout the several figures.

Figure 1:
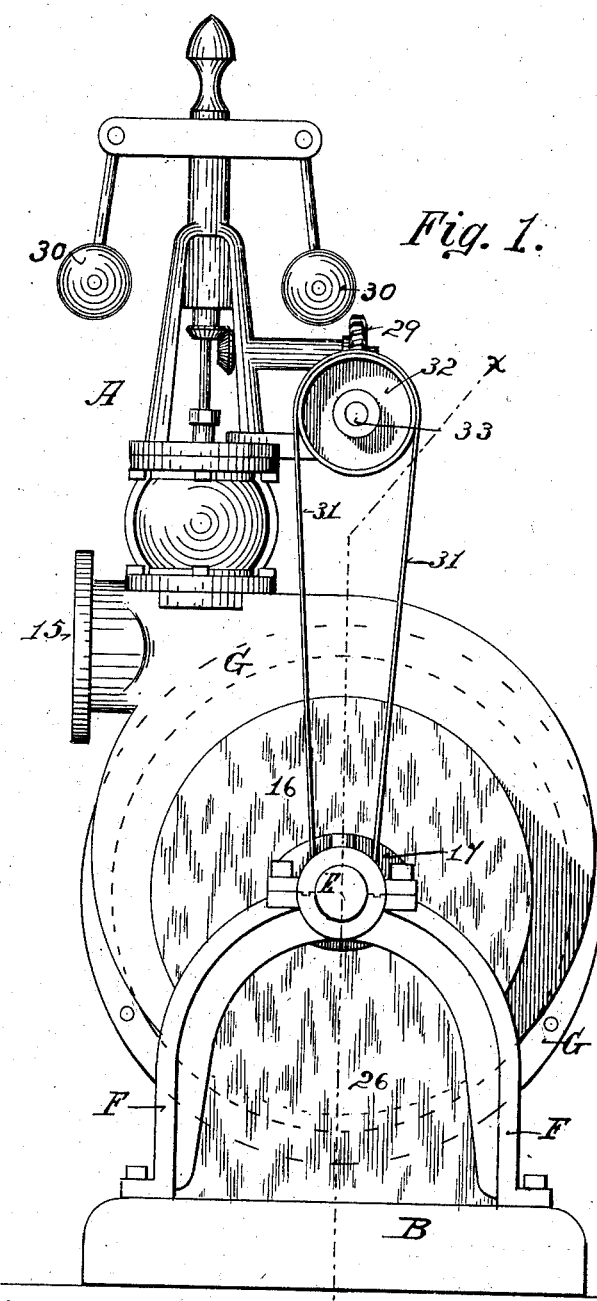
Figure 2:
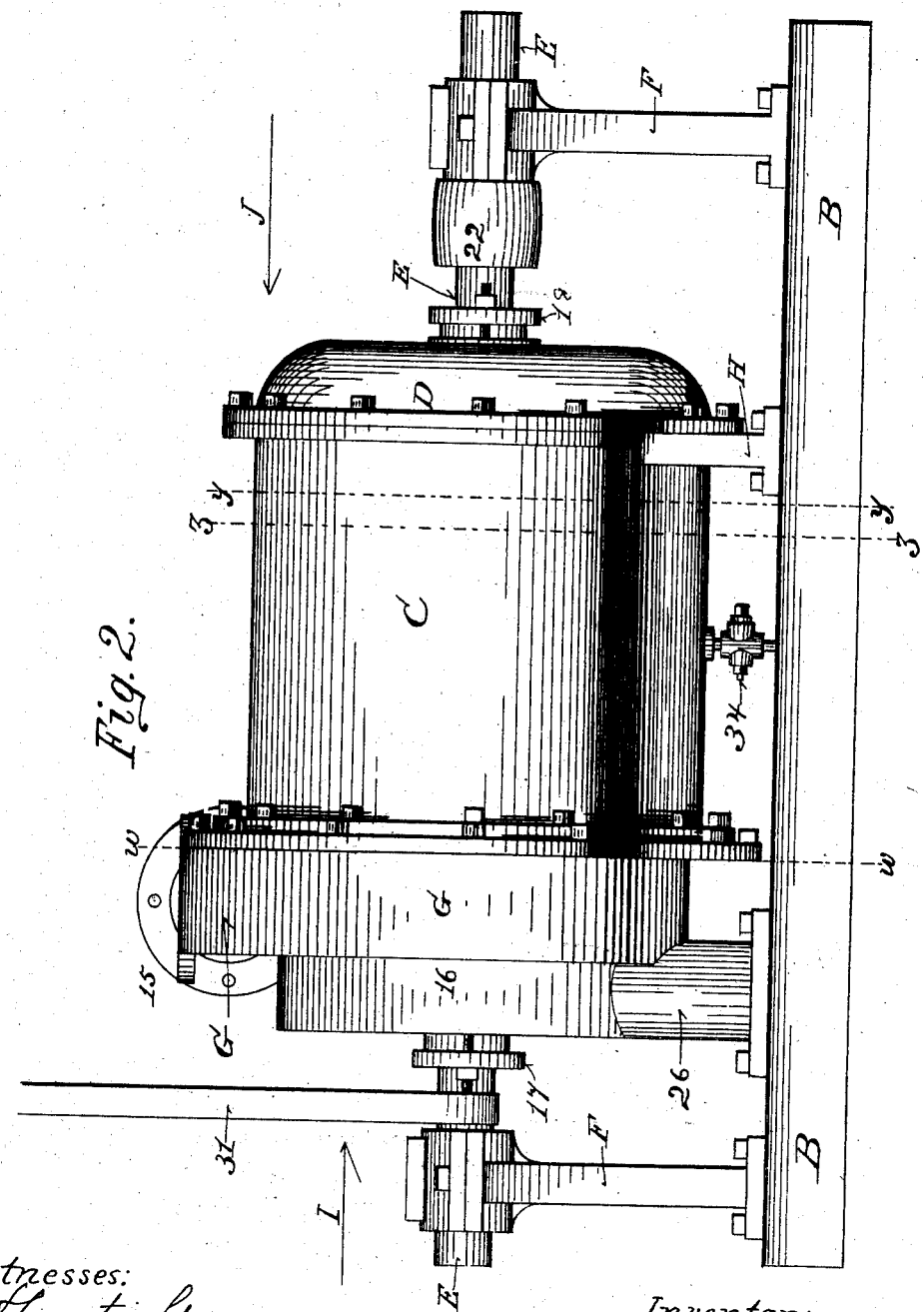
Figure 3:
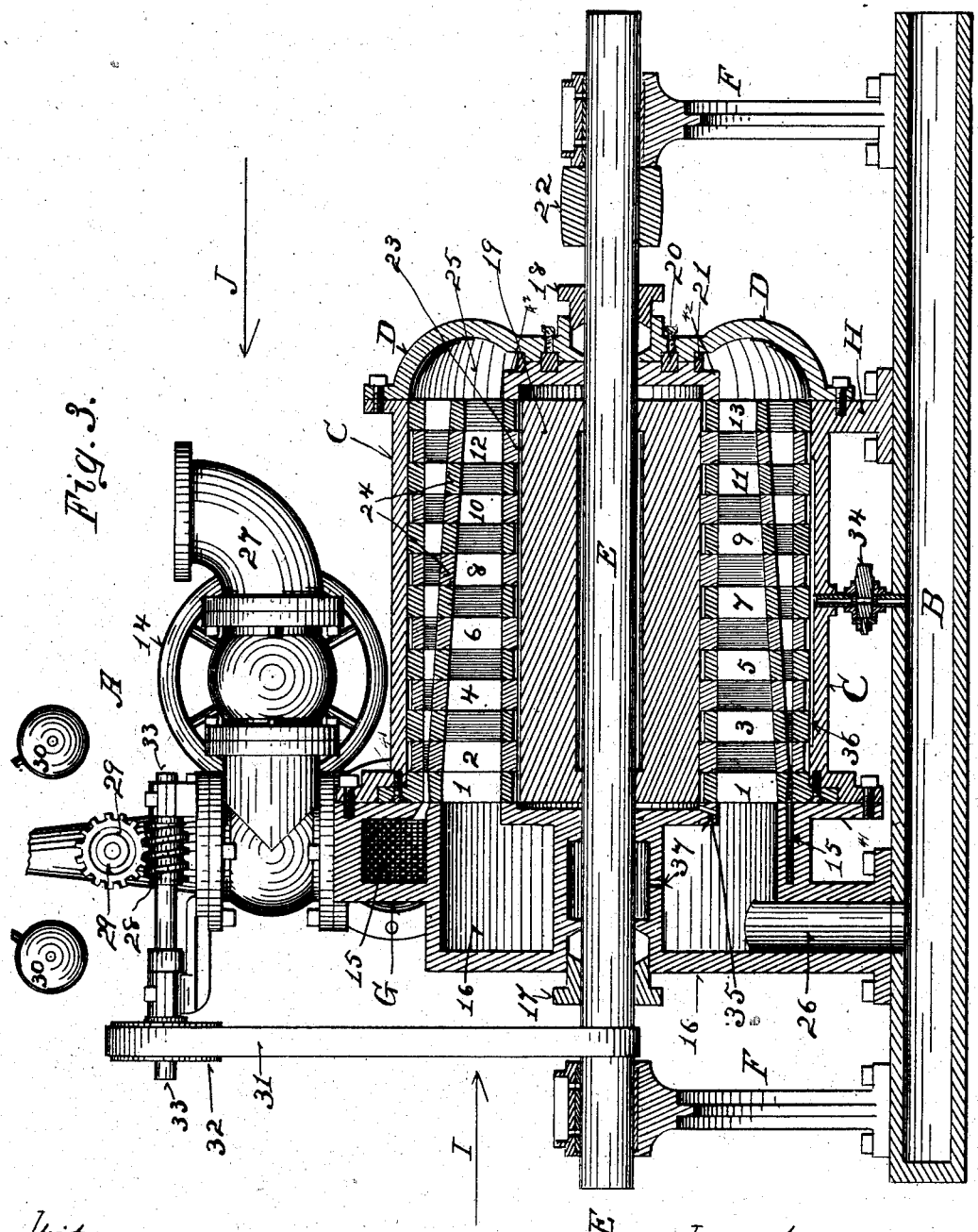
Figure 4:
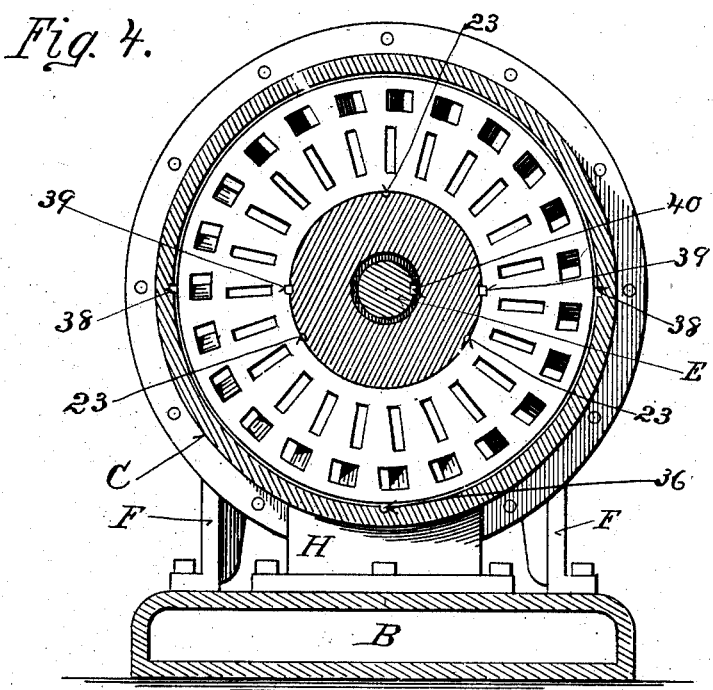
Figure 5:
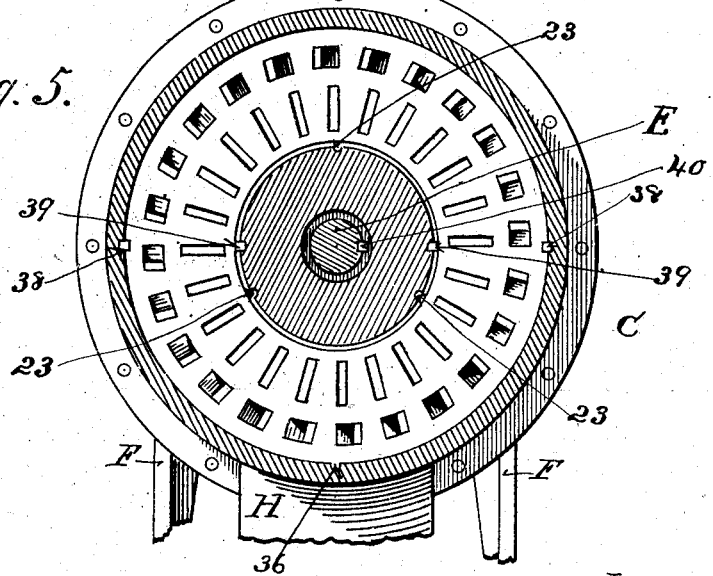
Figure 6:
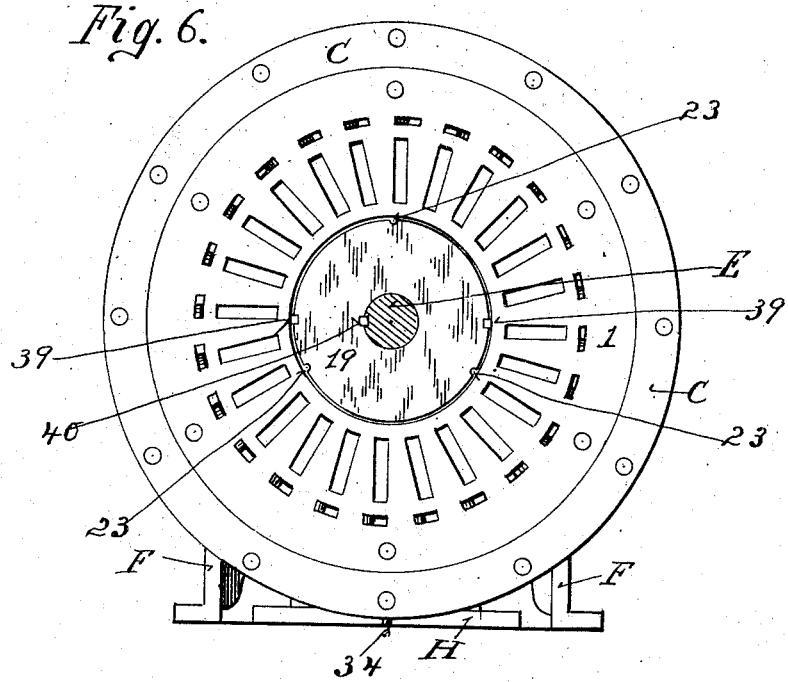
Figure 7:
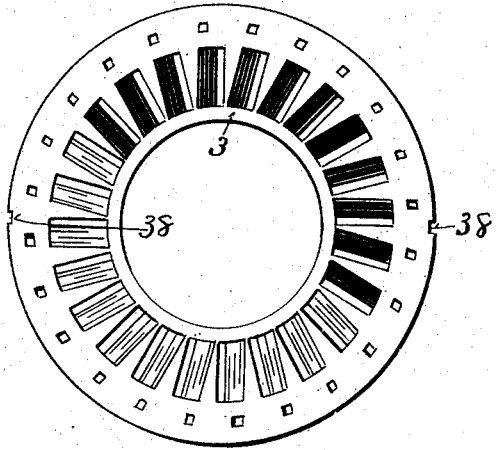
Figure 8:
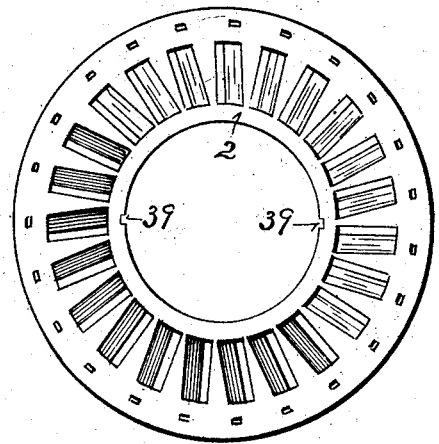

Figure 1 is an end elevation. Fig. 2 is a side elevation, omitting the steam feed and governor. Fig. 3 is a vertical longitudinal section, on line $x$, $x$, of Fig. 1, showing the deflectors all registering with the ports in the revolving or power rings. Fig. 4 is a vertical transverse section on line $y$, $y$, of Fig. 2, in the direction of arrow I. Fig. 5 is a vertical transverse section on line $z$, $z$, of Fig. 2, in the direction of the arrow I, with the base broken away. Fig. 6 is a vertical transverse section on line $w$, $w$, of Fig. 2, in the direction of the arrow I. Fig. 7 is an elevation of deflector 3, looking in the direction of arrow J. Fig. 8 is an elevation of revolving ring 2, in the direction of arrow J. Fig. 9 is an enlarged detail elevation of part of revolving ring 12, and deflector 13, in the direction of arrow I. Fig. 10 is an enlarged detail section on line $t$, $t$, of Fig. 9. Fig. 11 is an enlarged detail section on line $s$, $s$, of Fig. 9, showing the steam ports not contracted. Fig. 12 is an enlarged detail section on line $s$, $s$, of Fig. 9, showing the steam ports slightly contracted.

The cylindrically shaped casing C, that has provided at one end the steam chest G, having a governor A, of any ordinary type or make, and an exhaust chamber 16, with its discharge 26, that also acts as a support at one end, for the casing C which is provided with support H, at the other end. Longitudinally through the said casing C, is secured the driving shaft E, that is provided with a stuffing box 18, secured to the end D, and a stuffing box 17 secured to exhaust chamber 16. The driving shaft E carries thereon, and within the casing C, a cylindrically shaped drum 19, that is firmly secured on the shaft E by keys and key-ways 40, 40, the drum 19 has fitted thereon a number of power rings 2, 4, 6, 8, 10, and 12, made to operate alternately between the deflectors 1, 3, 5, 7, 9, 11 and 13. The purpose of using the drum 19 is to lighten the deflectors and rings in the center, as that part of them, if utilized as steam ports, would not give the same power as the equal area of deflection farther from their axial center. To the inner side of the casing C, is secured by the keys, and key-ways 38, 38, the deflectors 1, 3, 5, 7, 9, 11, and 13, having the centers cut out so that the drum 19 may revolve clearly within the opening. The shaft E is supported by bearings F, F, and carries the driving pulley 22.

The steam feed-passage 15, that is provided with a throttle wheel 14, has on one side a passage for the steam to enter the deflection ports in deflector 1, under a high pressure; as shown in Fig. 6, as the outer circle of ports. The direction of the ports being at an angle of near 45 degrees from the axis of the deflectors. This deflector 1, is secured to the end of the casing C by screw bolts 41, 41, etc., and has no deflection in the low pressure direction of arrow J.

The revolving or power ring 2, shown as Fig. 8, is provided with steam ports of slightly larger size in length, and of a number one less, than is provided in deflector 1, the purpose of which will be hereafter explained. The direction of the ports through this ring, being at nearly right angles to that of the ports in deflector 1, see Figs. 11 and 12. This change of deflection is the same in each set of rings. The size of the ports in each set of rings, is increased by enlarging radially to the center in the high pressure direction and from the center in the low direction, corresponding proportionately to the expansion of the steam in commission. This increase in the size of the ports, continues through the deflectors and rings in the direction of arrow I of the high pressure ports, and back in the direction of arrow J through the low pressure ports, and is commensurate with the expansion of the steam in commission, the purpose being to utilize to the fullest extent the expansive power of the steam. The end thrust on the deflectors and rings in the high pressure direction I, is counter-acted by the low pressure direction J, and adjusted by the packing rings 20 and 21, and any escapement of steam between the disks and from the high to low pressure ports is prevented by the continuing band 24, and by the back pressure on the solid part of deflector 13 and on the flange of drum head 42. Any condensation of the steam within the casing C escapes through the grooves 23, 23, 23, and the opening 35, into the exhaust chamber 16; and the drain groove 36, and stop cock 34.

The number of steam ports in the deflectors is one more than in the revolving or power rings, so that at no position will all of the ports be closed. Steam being allowed to enter the feed passage 15, by the turning of the throttle 14, and as controlled by the governor A, passes through the high pressure ports of deflector 1, and as directed by the angle of deflection, strikes the high pressure ports of the revolving ring 2, at nearly right angles, (the deflectors being shown in Fig. 3, by the odd numbers 1 to 13, and revolving rings by the even numbers 2 to 12,) the deflector 1, being fixed, and the ring 2 permitted to revolve on its axis (the drum 19 and shaft E) is forced to revolve to the right, and the expansion of the steam continues this motion until the steam confined in this set of ports escapes into the high pressure ports of the next deflector 3, the ports in this deflector are increased in size by enlargement in their radial direction only, to correspond with and proportionately to the expansion of the steam received by them, the angle of the deflection of its ports being at nearly a right angle to its revolving mate ring 4. Each deflector and its revolving ring mate receives the action of the steam in passing in the high pressure direction of arrow I, and as returned by the casing-end D, through the low pressure ports in the direction of the arrow J. The angle of deflection of the high pressure ports being reversed in the low pressure ports, so that the action of the steam through the low pressure ports drives the revolving rings in the same direction as when passing through the high pressure ports.

I am aware of the fact that other engines of this type use stationary and revolving disks or rings, but, so far as known to me, none of them provide for the expansion of the steam which is the strong feature of this invention.

The steam ports may be rectilineal, circular, elliptical or square in form.

I claim—

1. The combination of a cylindrically shaped casing, a revoluble shaft passing axially therethrough, that is supported with bearings and carrying thereon a pulley, and also within the casing, perforated rings whose perforations are coincident in area and position, but opposed in direction to stationary deflectors, the deflectors having one more perforation than in the revoluble ring following, and packing rings that are placed between one end of the casing and the perforated rings.

2. The combination of a cylindrically shaped casing having an ingress and egress at the same end, a revoluble shaft placed axially through said casing and supported by bearings, and also within the casing and fitted on the said shaftrings having ports coincident in area and position but opposed in direction to stationary deflectors that are placed alternately with the said rings, the area of each succeeding port increasing in proportion to and commensurate with the expansion of the steam in use, with adjustable packing rings that are placed between one end of the said casing and the adjacent deflector.

FRANK E. HAVEN.

Witnesses:
A. H. CUTRIGHT,
WM. R. HALL.